US009838724B2

(12) United States Patent
Ghosal et al.

(10) Patent No.: US 9,838,724 B2
(45) Date of Patent: Dec. 5, 2017

(54) MEDIA DISTRIBUTION NETWORK FOR LIVE STREAMING

(71) Applicant: International Business Machines Corporation, Armonk, NY (US)

(72) Inventors: Sugata Ghosal, Bangalore (IN); Vijay Mann, Bangalore (IN); Raghavendra Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 14/944,642

(22) Filed: Nov. 18, 2015

(65) Prior Publication Data

US 2017/0142450 A1     May 18, 2017

(51) Int. Cl.
| | | |
|---|---|---|
| H04N 21/2187 | (2011.01) | |
| H04N 21/2225 | (2011.01) | |
| H04N 21/6405 | (2011.01) | |
| H04N 21/2183 | (2011.01) | |
| H04N 21/647 | (2011.01) | |
| H04N 21/218 | (2011.01) | |

(52) U.S. Cl.
CPC ..... *H04N 21/2187* (2013.01); *H04N 21/2181* (2013.01); *H04N 21/2183* (2013.01); *H04N 21/2225* (2013.01); *H04N 21/6405* (2013.01); *H04N 21/64738* (2013.01)

(58) Field of Classification Search
None
See application file for complete search history.

(56) References Cited

U.S. PATENT DOCUMENTS

| | | |
|---|---|---|
| 7,526,564 B2 | 4/2009 | Guo et al. |
| 8,566,436 B1 | 10/2013 | Stoica et al. |
| 8,654,784 B2 | 2/2014 | Starks et al. |

(Continued)

OTHER PUBLICATIONS

NAB 2015: End-to-end live streaming through the cloud, http://nab15.mapyourshow.com/6_0/sessions/session-details.cfm?ScheduleID=109, 2015 NAB Show, Apr. 15, 2015, pp. 1-2.

(Continued)

*Primary Examiner* — Omar S Parra
(74) *Attorney, Agent, or Firm* — Ryan, Mason & Lewis, LLP

(57) ABSTRACT

Methods, systems, and computer program products for implementing a media distribution network for live streaming are provided herein. A computer-implemented method includes directing live video content from a sender device to a first video processing node hosted on a first server within a network, wherein the first server is located within a given geographical proximity of the sender device; determining locations within the network for hosting additional video processing nodes within a given geographical proximity of a receiver device; transmitting the live video content from the first video processing node to an additional video processing node within the network by implementing (i) a multicast overlay network over the network and (ii) a data transfer protocol between the video processing nodes in conjunction with the multicast overlay network; and transmitting the live video content from the additional video processing node to the receiver device associated with the additional video processing node.

19 Claims, 10 Drawing Sheets

(56) References Cited

U.S. PATENT DOCUMENTS

| | | | | |
|---|---|---|---|---|
| 2005/0015511 | A1* | 1/2005 | Izmailov | H04L 12/18 709/238 |
| 2013/0031211 | A1 | 1/2013 | Johnson et al. | |
| 2013/0204961 | A1* | 8/2013 | Fliam | H04L 67/2885 709/214 |
| 2013/0304864 | A1 | 11/2013 | Cadwell et al. | |
| 2014/0079059 | A1* | 3/2014 | Amir | H04L 12/18 370/390 |
| 2015/0269257 | A1* | 9/2015 | Edlund | G06F 17/30864 707/770 |
| 2016/0344833 | A1* | 11/2016 | Hakansson | H04N 21/23103 |

OTHER PUBLICATIONS

Scellato et al., Track Globally, Deliver Locally: Improving Content Delivery Networks by Tracking Geographic Social Cascades—paper by Computer Lab, WWW 2011, Mar. 28-Apr. 1, 2011, pp. 1-10.

Jin et al., Toward Monetary Cost Effective Content Placement in Cloud Centric Media Network, 2013 IEEE International Conference on Multimedia and Expo (ICME). IEEE, 2013.

"Ericsson 2013 TV and Media Report," http://www.ericsson.com/res/docs/2013/consumerlab/tv-and-mediaconsumerlab2013.pdf, 2013, pp. 1-12.

J. Jiang, V. Sekar, I. Stoica, and H. Zhang, "Shedding Light on the Structure of Internet Video Quality Problems in the Wild," in ACM CoNext 2013.

"Maximizing Audience Engagement: How online video performance impacts viewer behavior," https://content.akamai.com/PG2114-Audience-Engagement-WP.html, 2015, pp. 1-10.

"Aspera FASP," http://asperasoft.com/technology/transport/fasp/, Oct. 31, 2015.

"Hotstar," http://www.hotstar.com/, Nov. 17, 2015, pp. 1-67.

"EVS Sports Broadcasting," http://www.evs.com/, Nov. 4, 2015, pp. 1-2.

"Real Time Streaming Protocol (RTSP)," https://www.ieff.org/rfc/rfc2326.txt, Apr. 1998, Schulzrinne et al., pp. 1-85.

"ABR Streaming," http://www.tvtechnology.com/cable-satelliteiptv/0149/abr-streaming/239523, Aug. 7, 2013, pp. 1-11.

"Docker," https://www.docker.com/, Nov. 17, 2015.

"UDT," http://udt.sourceforge.net/, 2011, pp. 1-1.

"Ffserver," https://www.ffmpeg.org/ffserver.html, Sep. 5, 2015, pp. 1-28.

"Ffmpeg," https://www.ffmpeg.org/, Nov. 17, 2015, pp. 1-13.

"Spring Boot," http://projects.spring.io/spring-boot/, Nov. 17, 2015, pp. 1-3.

"GeoLite IP Geolocation Database," https://dev.maxmind.com/geoip/geoip2/geolite2/, 2010, pp. 1-1.

"Packet Pair Technique," https://www.usenix.org/legacy/publications/library/proceedings/usits01/full papers/lai/lai html/node2.html, Jan. 29, 2001, pp. 1-7.

"Softlayer API," http://developer.softlayer.com/reference/softlayerapi, Nov. 1, 2015, pp. 1.

"IBM Cloudant," https://cloudant.com/, Sep. 19, 2015, pp. 1-1.

"Protocol Independent Multicast—Sparse Mode (PIM-SM)," https://tools.ieff.org/html/rfc4601, Aug. 2006, pp. 1-112.

A. Iyer, P. Kumar, and V. Mann, "Avalanche: Data center Multicast using software defined networking," in COMSNETS 2014.

A. Balachandran, V. Sekar, A. Akella, and S. Seshan, "Analyzing the Potential Benefits of CDN Augmentation Strategies for Internet Video Workloads," in IMC 2013.

M. K Mukerjee, D. Naylor, J. Jiang, D. Han, S. Seshan, and H. Zhang, "Practical, Real-time Centralized Control for CDN-based Live Video Delivery," in SIGCOMM 2015.

http://www.softlayer.com/network, Nov. 17, 2015, pp. 1-4.

"Building Java Projects with Maven," http://spring.io/guides/gs/maven/, Nov. 16, 2015, pp. 1-10.

"Periscope," https://www.periscope.tv/, Nov. 17, 2015, pp. 1-1.

Wikipedia, Meerkat (app), https://en.wikipedia.org/w/index.php?title=Meerkat_(app)&oldid=687805014, Oct. 27, 2015.

* cited by examiner

302

Input: V: set of all servers that are part of cSTREAM, L: set of network links
1: function INFRAMONITOR(V, L)
2:     /*Collect statistics*/
3:     COLLECTBWSTATS(V)
4:     COLLECTCPUUTIL(V)
5:     COLLECTMEMUTIL(V)
6:     /*Notify listeners of update ()*/
7:     Notify()
8: end function

Input: V: set of all candidate servers
Output: Σ: set of scores
1:  function SCOREMANAGER(V)
2:      for all $v \in V$ do
3:          $P_v \leftarrow$ GETPATHS(v)
4:          for all $P \leftarrow P_v$ do
5:              /*Compute scores*/
6:              $\alpha \leftarrow$ GETBWUTILIZATION(v)
7:              $\beta \leftarrow$ GETCPUUTILIZATION(v)
8:              $\gamma \leftarrow$ GETMEMUTILIZATION(v)
9:              $\delta \leftarrow$ GETCOST(v)
10:             $\Sigma_{v,P} \leftarrow$ GETSCORE($\alpha, \beta, \gamma, \delta$)
11:             $\Sigma \leftarrow \Sigma \cup \Sigma_{v,P}$
12:         end for
13:     end for
14:     /*Notify listeners of update ()*/
15:     NOTIFY()
16:     return $\Sigma$
17: end function

Input: $\alpha, \beta, \gamma, \delta$: resource utilization values
Output: $\Sigma_v$: computed score
Constants: $\{w_i\}$ = weights of parameters $i \in \{\alpha, \beta, \gamma, \delta\}$
 1: function GETSCORE($\alpha, \beta, \gamma, \delta$)
 2:     $\Sigma_v \leftarrow \Sigma(w_i\, i^2)$
 3:     return $\Sigma_v$
 4: end function

Input: V: set of all data centers, $IP_{SRC}$ : client IP, $\Theta$: map of
    number of VPNs (PPs and RSPs) assigned per server since
    last score update
Output: $V$: candidate server for PP (or RSP)
1: function PPANDRSPSELECTOR(V, $IP_{SRC}$)
2:     L ← GETLOCATIONFROMGEOLITE($IP_{SRC}$)
3:     Q ← GETTHRESHOLDQFROMCONFIG
4:     $V_N$ ← GETQNEARESTDCs(L, Q)
5:     if SCORESUPDATERECEIVED() = true then
6:         /* Scores updated, consider all
7:           servers and clear flow
8:           count map*/
9:         $V_A$ ← GETALLACTIVESERVERS($V_N$)
10:        CLEARVPNCOUNTS($\Theta$)
11:    else
12:        /* Only consider servers that have
13:          been assigned least VPNs since
14:          last score update*/
15:        $V_A$ ← GETLEASTVPNCOUNTSERVERS($\Theta$, $V_N$)
16:    end if
17:    for all $v \in V_A$ do
18:        P ← GETPATH($IP_{SRC}$, v)
19:        /* compute score for the server*/
20:        $\Sigma_v$ ← GETSCORE(v,P)
21:    end for
22:    $V$ ← $v \in V_A$ such that $\Sigma_v$ is minimum
23:    /* Update VPN count map*/
24:    INCREMENTVPNCOUNT($\Theta$, $V$)
25:    return $V$
26 end function

Input: V: set of all servers, $\Sigma_V$: score of $V$, candidate member for PP or RSP
Output: $N$: new candidate server for activation
Constants: $\tau_{UP}$ : threshold score for scale-up decision 1: function SCALEUP(V, $\Sigma_V$)
2:     $V_P \leftarrow$ GETPENDINGMEMBERS(V)
3:     $V_I \leftarrow$ GETINACTIVEMEMBERS(V)
4:     if $\Sigma_V \geq \tau_{UP}$ , $|V_P| = 0$ and $|V_I| > 0$ then
5:         $DC_V \leftarrow$ GETDATACENTERS($V$)
6:         for all $v \in V_I$ do
7:             /* Get the first new server in the same DC as V */
8:             $DC_v \leftarrow$ GETDATACENTER($V$)
9:             if $DC_v = DC_V$ then
10:                 $N \leftarrow v$
11:                 return $N$
12:             end if
13:         end for
14:     end if
15:     return $N$
16: end function

Input: $V$: set of all servers
Output: $D$: candidate server for deactivation
Constants: $\tau_{DOWN}$: threshold score for scale-down decision
1: function SCALEDOWN(V, $\mathcal{V}$)
2:     $V_A \leftarrow$ GETACTIVEMEMBERS(V)
3:     $c \leftarrow 0$
4:     for all $v \in V_A$ do
5:        /*Get last hop utilization*/
6:        $l \leftarrow$ GETLINK($v$)
7:        $\alpha \leftarrow$ GETBWUTILIZATION($l$)
8:        /*Get server resource utilization*/
9:        $\beta \leftarrow$ GETCPUUTILIZATION($v$)
10:       $\gamma \leftarrow$ GETMEMUTILIZATION($v$)
11:       $\delta \leftarrow$ GETCOST($v$)
12:       /*Compute score for the member*/
13:       $\Sigma_v \leftarrow$ GETSCORE($\alpha,\beta,\gamma,\delta$)
14:       if $\Sigma_v < \tau_{DOWN}$ then
15:          $c \leftarrow c + 1$
16:       end if
17:     end for
18:     if $c > |V_A|/2$ then
19:        $D \leftarrow v \in V_A$ with longest uptime
20:     end if
21:     return $D$
22: end function

FIG. 8

MEDIA DISTRIBUTION NETWORK FOR LIVE STREAMING

FIELD

The present application generally relates to information technology, and, more particularly, to network management techniques.

BACKGROUND

Live streaming and video on demand are increasing in popularity. However, existing live video streaming approaches suffer, for example, from high buffering ratios, high join times, high join failures and low average bit rates. The economic impact of such challenges is substantial. Traditional content delivery networks (CDNs) are commonly intended for serving static files and web page fragments. However, a live video stream generally needs to travel from a live event location to distributed viewers in real-time. Given the constraints on real-time delivery and quality-of-service required, enterprises often cannot use existing content delivery networks for real-time geographic distribution of content, and often rely on dedicated leased lines for such transfers, resulting in an inefficient use of bandwidth and/or a reduced user experience.

SUMMARY

In one embodiment of the present invention, techniques for implementing a media distribution network for live streaming are provided. An exemplary computer-implemented method can include steps of directing a live video content stream from a sender device to a first video processing node that is hosted on a first server within a given network, wherein the first server is located within a given geographical proximity of the sender device; determining one or more locations within the given network for hosting one or more additional video processing nodes within a given geographical proximity of at least one receiver device; transmitting the live video content stream from the first video processing node to at least one of the one or more additional video processing nodes within the given network, wherein such transmitting comprises implementing (i) a multicast overlay network over the given network and (ii) a data transfer protocol between the video processing nodes in conjunction with the multicast overlay network; and transmitting the live video content stream from the at least one additional video processing node to the at least one receiver device associated with the at least one additional video processing node.

In another embodiment of the invention, an exemplary computer-implemented method can include steps of directing a live video content stream from a sender device to a first video processing node that is hosted on a first server within a network; determining one or more locations within the network for hosting one or more additional video processing nodes; and associating a receiver device with a second video processing node at one of the one or more determined locations within the network. The method can also include transmitting the live video content stream from the first video processing node to at least the second video processing node; and transmitting the live video content stream from the second video processing node to the receiver device.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a diagram illustrating an infrastructure monitoring service, according to an exemplary embodiment of the invention;

FIG. 4 is a diagram illustrating a score manager service, according to an exemplary embodiment of the invention;

FIG. 5 is a diagram illustrating a score function, according to an exemplary embodiment of the invention;

FIG. 6 is a diagram illustrating a publishing point (PP) and receiver side proxy (RSP) selection algorithm, according to an exemplary embodiment of the invention;

FIG. 7 is a diagram illustrating capacity planning for scaling up, according to an exemplary embodiment of the invention;

FIG. 8 is a diagram illustrating capacity planning for scaling down, according to an exemplary embodiment of the invention;

DETAILED DESCRIPTION

Figure 1:
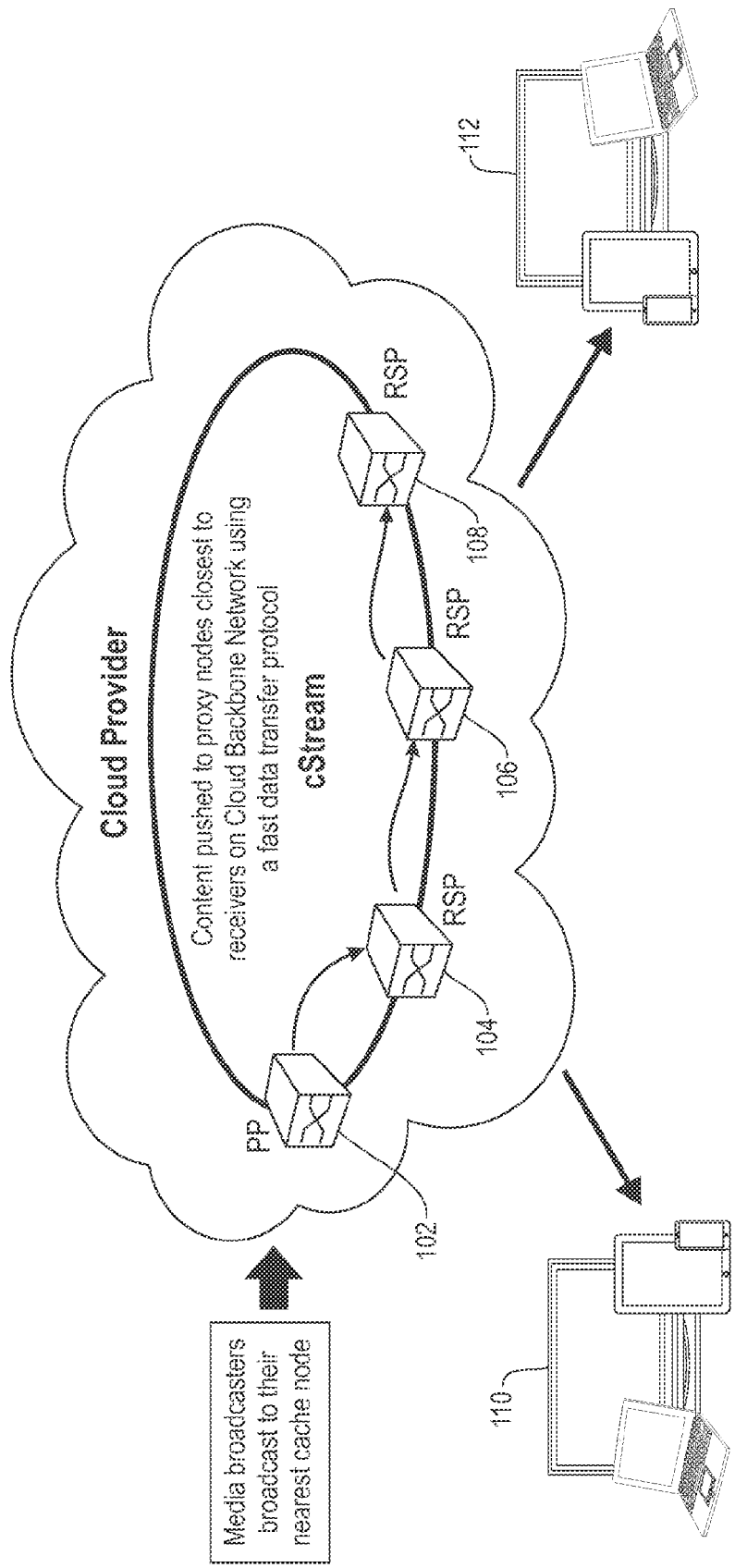
FIG. 1 is a diagram illustrating system design, according to an exemplary embodiment of the invention.

As described herein, an embodiment of the present invention includes implementing a media distribution network for live streaming. An example embodiment of the invention (also referred to herein as "CSTREAM") includes cloud-based live video delivery network. Such an embodiment can include leveraging the cloud provider's global footprint, the cloud provider's high performance backbone network between different data centers, social media analytics and a user datagram protocol (UDP) based fast data transfer protocol to optimize the quality of experience for end users, and the total cost incurred by the cloud provider in terms of network bandwidth and compute resources. CSTREAM enables a video broadcaster to be redirected to its closest publishing point (PP), hosted inside the closest cloud data center, and transfers the live stream using a UDP based fast protocol to one or more receiver side proxy (RSP) nodes (hosted on different cloud data centers) worldwide, before being delivered to the eventual receiver devices. Also, as detailed herein, one or more embodiments include implementation with the need to make any changes to end devices.

One or more embodiments of the invention include identifying possible nodes (PP and RSP nodes) for caching live video content based on social media information and also identifying the fastest path to carry out the video transfer by using a multicast overlay network in the cloud infrastructure. Such an embodiment can include selecting one or more seed locations as RSP nodes based on user-specified and/or predicted popular locations for the live feed, and receiving the content from the RSPs by pulling the correct resolutions and/or encodings from RSPs and/or through a push from RSPs. As used herein, "resolutions" refer to the different resolutions of a video feed required for different screen sizes. For example, different mobile phones can require different resolutions based on screen sizes (such as 640×360 or 1280×720). Also, as used herein, "encodings" refer to the encoder format (or codec) used (such as 3 gpp, mp4, mpeg, avi, etc.) and the bit rates used (300 kilobits per second (Kbps), 700 kbps, 1.5 Mbps, etc.). A higher bit rate denotes a higher video quality.

Additionally, such an embodiment can also include utilizing an existing RSP on an application level multicast tree if the network latency of that RSP to the receiver is within a certain bound of the optimal RSP, with reduced startup time and cloud backbone network bandwidth. If this is not possible, a new RSP can be created on the application level multicast tree for every new receiver that joins the live feed.

As noted and further detailed herein, at least one embodiment of the invention includes creating an application level multicast overlay between PP and RSP nodes, such that each RSP node can receive a live feed either directly from the PP node or from its closest RSP node. Additionally, one or more embodiments of the invention include using social media data for predicting the popularity of a certain live event to implement one or more seed cloud data center locations to host RSP nodes. By way of example, in connection with at least one embodiment of the invention, a system may allow pre-registration of a live feed that specifies the sender location and a description of the live feed using tags (for example, a soccer match between two countries). The same tags can then be used to search social media data to predict the popularity of that event at different locations in the world. Based on this predicated popularity, certain seed locations may be used to host RSP nodes.

At least one embodiment of the invention includes analytics driven content adaptation and distribution. Such analytics can include, for example, social media analytics for pre-fetching and/or pre-pushing content to cache nodes closer to potential hot spots based on social media analytics (user posting sentiment analysis, etc.). Also, media adaption can include leveraging a software-defined network (SDN) to implement dynamic bit rate control and path selection. One or more embodiments of the invention can include inferring dynamic end-to-end network conditions (round-trip time (RTT), congestion, packet loss, jitter, etc.) through selective packet inspection at the controller. The controller, as noted above, refers to a software defined network (SDN) controller that can install rules in the network to replicate incoming and outgoing packets to itself for further inspection.

Additionally, dynamic controlling of encoded bit rates at the encoder can be triggered to help improve quality-of-experience (QoE). For example, if the SDN network controller determines that the network path from an RSP to the receiver device has been congested for a considerable period of time, the controller can trigger the RSP to downgrade the bit rates being produced for that given live video feed (say, from 1.5 Mbps to 700 kbps). This will reduce the processing requirements at the RSP without affecting the quality-of-experience for the end-users, because the higher bit rates were not being used due to the congested link from RSP to the receiver device. Further, dynamic path selection can be implemented if multiple paths to the receiver exist. For example, if the SDN controller determines that the current path from the RSP to a receiver device is congested, the controller can dedicate a new RSP node in the multicast overlay that has a different (uncongested) path to the receiver device.

A number of terms used herein in connection with one or more embodiments of the invention are defined below. For example, a content delivery network (CDN) typically includes a large number of cache nodes or points of presence (PoPs) distributed geographically and interconnected by a medium-to-high bandwidth network. PoPs, as used herein, refer to data centers (which may be dedicated or shared with other cloud providers) belonging to a cloud provider at a given location. A website host (also referred to herein as the "origin host") will redirect an incoming client request to its nearest cache nodes based on its geographical location. The cache node will check for the content (static web page fragments, images, files, etc.) being requested in its local disk (or local area network) and if found, the cache node will serve the request locally. If not found, the cache node will pull a copy of the content from the origin server. This is the typical "pull mode" of operation of a CDN. It is also possible to push content proactively (referred to as "push mode") to all or one or more selected cache nodes.

As also used herein, video on demand (VoD) refers to video that is hosted on one or more servers in the cloud and is streamed to a viewer when the viewer explicitly requests that video. Live Internet video refers to scenarios wherein a live event is broadcast to one or more viewers over the Internet. Live video is typically captured by a camera (which could be on a mobile phone, for example), converted into one or more desired formats at predetermined bit rates, and then sent directly to the viewers or transferred to one or more origin servers on the cloud. Once a live video feed is hosted on an origin server, the feed is streamed in a manner analogous to VoD.

Real-time streaming protocol (RTSP) and hypertext transfer protocol (HTTP) are two example protocols for streaming live video and VoD. HTTP, for example, is widely supported across devices and firewalls and is commonly used for streaming video (via, for example, HTTP live streaming (HLS)).

Both live and VoD can use adaptive bit rate (ABR) streaming (or HTTP progressive downloads in the case of HTTP). By way of example, a video file can be first broken into small chunks or segments through a process referred to as ABR chunking. Each chunk is of a small duration (for example, less than 10 seconds), and is encoded at different bit rates. The client video player requests the initial chunk based on the observed bandwidth to the server. As the video plays, if the channel conditions between the client and the video server improve, the client can request the next chunk at a higher bit rate. If the channel conditions worsen, the client can request the next chunk at a lower bit rate. This adaption of bit rates assists in providing seamless quality-of-experience and graceful degradation in the presence of jittery network conditions. Breaking a video file into small chunks, in the case of HTTP progressive downloads, also makes the streaming process CDN-friendly because the small chunks can be cached and served similar to other web content.

Both VoD and live video can make use of ABR streaming and HTTP progressive downloads. However, in case of live videos, traditional CDNs can distribute the live video feed only after the feed is available on an origin server on the cloud. This implies that if there is a live event in Australia, and the origin server is in the US, even to serve a local client in Australia, the live feed has to be first transferred to the origin server in the US.

Accordingly, CDNs for live video require extensive central processing units (CPUs) and storage resources that are typically associated with cloud providers. These resources are required both at the ingress and egress points in the cloud network to host various video processing and handling tasks. Cloud demand elasticity enables the cloud provider to reuse these resources for other workloads when the live video workload reduces in volume.

Accordingly, one or more embodiments of the invention can include implementing orchestrator nodes (ONs) and video processing nodes (VPNs). Also, as further detailed herein, VPNs can include PPs and RSPs.

FIG. 1 is a diagram illustrating system design, according to an embodiment of the invention. By way of illustration, FIG. 1 depicts media broadcasters broadcasting to the nearest cache node, which in FIG. 1 is PP 102. Additionally, the content (from the broadcasters) can be pushed to proxy nodes (such as RSP 104, RSP 106 and RSP 108) closest to receivers (such as receiver 110 and receiver 112) on a cloud backbone network using a fast data transfer protocol.

A PP node, as used herein, is an example of a VPN. PP nodes can include containers running a video streaming engine and custom data transfer stack. PP nodes also can be hosted inside a cloud data center that exists in physical proximity to the sender of the live video stream. For each live video stream, at least one embodiment of the invention includes selecting a PP node based on physical location, overall resource utilization (CPU, memory and network) and/or cost of a data center.

An RSP node, as used herein, is another example of a VPN. RSP nodes can include containers identical to PP nodes except that RSP nodes are hosted inside cloud data centers that exist in close physical proximity to their respective receivers of a given live video stream. For each live video stream, at least one embodiment of the invention includes selecting one or more RSP nodes based on physical location, overall resource utilization (CPU, memory and network) and/or cost of a data center.

An ON contains business logic and hosts the application programming interfaces (APIs) to be used by senders and receivers. Senders, for example, can use a REST API to upload a live video, and the ON redirects the sender stream to the selected PP node. Similarly, receivers, for example, can use a REST API to join a live video stream, and the ON redirects the receivers to their respective selected RSP nodes. An ON, as described herein, can include logic for PP and RSP node selection, infrastructure monitoring, capacity planning and automated scaling.

Example implementations for one or more embodiments of the invention can include a multi-screen social television (TV) integrated with social sense via a second screen. Social TV includes multiple subsystems, including interactive TV, social sense, and multi-screen orchestration. A data social platform can be used, for example, to search social data in the context of contents and discovers the geo-location-aware public perception and knowledge related to media content. Multi-screen orchestration provides an intuitive human-computer interface to combine the interactive TV and social sense subsystems, fusing the TV viewing experience with social perception. This example implementation can be built upon a media cloud, which provides on-demand virtual machines for content platform services, including media distribution, storage, processing, etc.

Figure 2:
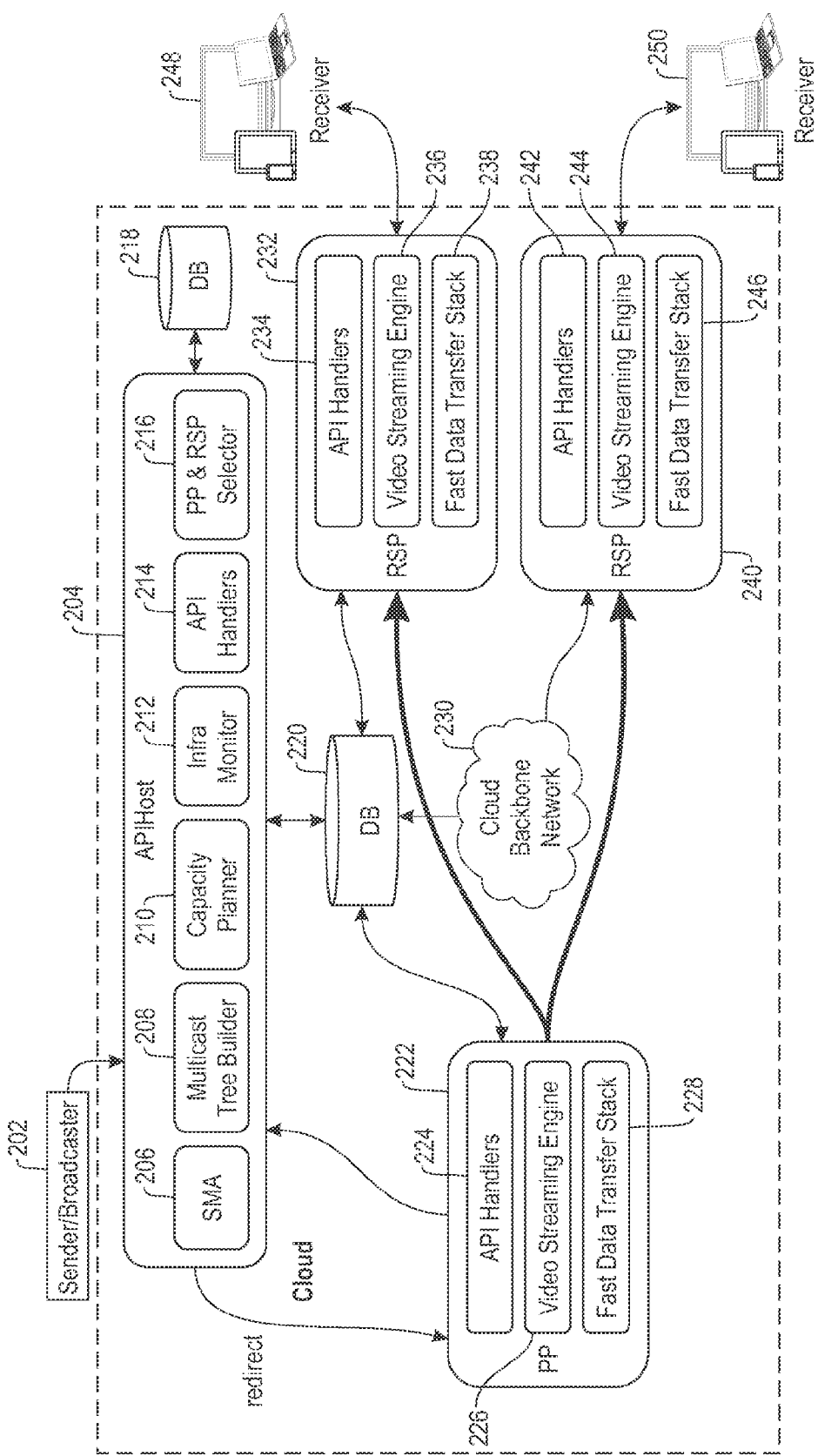
FIG. 2 is a diagram illustrating system architecture, according to an exemplary embodiment of the invention.

FIG. 2 is a diagram illustrating system architecture, according to an exemplary embodiment of the invention. By way of illustration, FIG. 2 depicts a content sender and/or broadcaster 202, which provides content to a host application programming interface (API) 204. The host API 204 includes a social media analytics (SMA) component 206, a multicast tree builder component 208, a capacity planner component 210, an infrastructure monitoring component 212, an API handler component 214, and a PP and RSP selector component 216. The host API 204 further interacts with geo-location-to-internet protocol (IP) mapping database (DB) 218 and video metadata DB 220, as well as PP 222. Geo-location-to-IP mapping database 218 is a third-party database that stores the mapping of IP addresses to corresponding physical locations. The video metadata DB 220 stores metadata related to a video feed such as video feed identifier (ID) and IP addresses of the sender device, the PP and RSP nodes. PP 222 includes an API handler component 224, a video streaming engine 226 and a fast data transfer stack 228. Also, PP 222 provides content to a cloud backbone network 230, which forwards the content to RSP 232 (which includes an API handler component 234, a video streaming engine 236 and a fast data transfer stack 238) and RSP 240 (which includes an API handler component 242, a video streaming engine 244 and a fast data transfer stack 246). RSP 232 and RSP 240 ultimately provide content to receiver 248 and receiver 250, respectively.

By way of illustrating an example flow of data according to the architecture depicted in FIG. 2, consider the following usage scenario. A content sender and/or broadcaster 202 contacts the host API 204 to broadcast its video feed. The host API 204 invokes the PP and RSP selector component 216 to determine the ideal PP node for this video feed. The PP and RSP selector component 216 makes use of the capacity planner component 210, the infrastructure monitoring component 212 and the geo-location-to-IP mapping database (DB) 218 to determine PP and RSP nodes. Once a PP node 222 has been identified, the host API 204 redirects the incoming live feed to the PP node 222. If this video feed has been registered earlier with some tags and/or description, the PP and RSP selector component 216 also invokes the SMA component 206 to predict seed locations where this specific video feed may be viewed. Once RSP locations (232 and 240) have been identified, they are stored in the video metadata DB 220 along with a video feed identifier and sender and PP details.

Further, the multicast tree builder component 208 is invoked to create an overlay multicast tree. If this video feed has not been registered earlier, the system waits for the first receiver to join the system. When a new receiver (248 or 250) joins the system and sends a request for the given video feed to the host API 204, the video metadata DB 220 acts as look-up table to determine the nearest RSPs (232 or 240) for a given video feed. The PP 222 and RSPs (232 and 240) both include an API handler component (224, 234 and 242, respectively), a video streaming engine (226, 236 and 244, respectively) and a fast data transfer stack (228, 238 and 246, respectively). The API handler 224 on the PP node handles the redirected request (from API Host 204) to upload a video by the sender. The API handler 224 on the PP also handles requests to fetch the video feed by other RSP nodes. The API handlers on the RSP nodes (234 and 242) handle the redirected request (from API host 204) to fetch a video (requested by the receivers). The video streaming engines are used for receiving video feed from the sender (at the PP node), to receive the video fetch request from the receiver, and to pull the video from the PP node or other RSP nodes (at the RSP node).

All data transfers between the PP node 222 and RSP nodes (234 and 242) takes place over the cloud backbone network 230, and using a fast data transfer stack (228, 238 and 246, respectively). RSP 232 and RSP 240 ultimately provide content to receiver 248 and receiver 250, respectively.

As detailed herein, VPNs can include a video streaming engine and a custom data transfer stack. PP and RSP nodes are similar in terms of functional components because all RSP nodes also act as a publishing point for nearby RSPs that request a video feed therefrom.

By way of example, at least one embodiment of the invention includes using ffserver as a video streaming server and ffmpeg as a video upload/download engine. ffserver and ffmpeg have support for video and audio encoders and decoders and more can be compiled and added. ffserver uses a configuration file to list all the video files it can stream, and ffserver code can be modified in one or more embodiments of the invention to ensure that new video feeds can be added dynamically to its configuration file without a restart. Also, streaming APIs can be used to send requested video feeds from PP nodes to RSP nodes, and from RSP nodes to other RSP nodes.

By way of example, at least one embodiment of the invention includes using a fast data transfer stack (such as Aspera FASP® byte streaming protocol) to transfer live video feed from PP nodes to RSP nodes and between RSP nodes themselves.

Orchestrator nodes (ONs) have API handlers for download and upload requests. The upload request can include a GET request, and the upload request handler on the ON invokes the PP selector algorithm (described herein) and sends the uniform resource locator (URL) of the PP node in the response to the sender. The sender sends the same GET request to the PP node, and a handler at the PP node first adds the video to be uploaded to the ffserver configuration file and to a database so that the video is available for RSPs immediately. The handler then sends the URL of the ffserver to the client in the response, who in turn issues a POST request to upload its video feed directly to its selected PP (running the ffserver).

Similarly, the download request (issued by a player interested in viewing the live video feed) can also include a GET request. A download request handler determines the client location using a database, and searches for a given number of the closest RSP location identifiers (IDs) and retrieves their IPs from a database using the IDs. A RSP selector algorithm (described herein) can be invoked, and the client can be redirected to the selected RSP. When the handler at the RSP receives a download request, the RSP checks if it (the RSP) already has the requested stream by querying a given database. If yes (that is, the RSP already has the requested stream), then the RSP redirects the receiver to the ffserver URL with that stream. If not (that is, the RSP does not have the requested stream), then the RSP adds the feed and stream to the ffserver configuration file and runs the ffmpeg command to get the stream from some other data center (which could be a PP or another close by RSP) that it obtains by querying a given database for the server with that stream. The live video feed, thus received from another RSP or the PP, is simultaneously streamed using the ffserver on the RSP (after adding the feed to the ffserver configuration file).

At least one embodiment of the invention includes monitoring and/or collecting multiple kinds of data including, for example, available bandwidth on the path from end clients (sender or receivers) to the potential PP or RSP nodes, and resource utilization information from one or more servers.

FIG. 3 is a diagram illustrating an infrastructure monitoring service 302, according to an exemplary embodiment of the invention. In accordance with one or more embodiments of the invention, an infrastructure monitoring service (also referred to herein as "InfraMonitor") measures available bandwidth from the "Q" potential PP or RSP host cloud data centers to the sender or receiver using a variant of packet pair algorithms. As used herein, "Q" refers to a threshold number that is specified as a configuration parameter. "Q" potential PP and RSP host data centers refer to "Q" cloud data centers that are geographically closest to the sender (or receiver, in case of RSP), as further described herein. Also, the infrastructure monitoring service can make use of native cloud APIs to monitor the resource (CPU, memory and network) usage of the various physical servers in each data center (that have been pre-provisioned in connection with one or more embodiments of the invention).

In one or more embodiments of the invention, an infrastructure monitoring service can also include a score manager service. Based on the measurements gathered by the infrastructure monitoring service, the score manager service computes scores for all provisioned servers whenever the score manager service receives an update notification from the InfraMonitor.

FIG. 4 is a diagram illustrating a score manager service 402, according to an exemplary embodiment of the invention. Such a score (as detailed above) is indicative of the resources available at the server's disposal, which can include (a) the available bandwidth on the path(s) to the server from a sender or a receiver, (b) the percentage of CPU utilization of the server, and (c) the percentage of memory utilization of the server. The lower the usage levels of a member's resources, the lower its score.

FIG. 5 is a diagram illustrating a score function 502, according to an exemplary embodiment of the invention. Given a resource with utilization value i, its relative importance towards the total score Σv is indicated by a user-defined weight $w_i$. Further, the contribution of an over-utilized resource is magnified by squaring the utilization value i to allow one or more embodiments of the invention to identify servers with resource bottlenecks. Thus, a server μ with CPU utilization β and low memory utilization γ will have a higher score than a server v with moderate β and γ.

FIG. 6 is a diagram illustrating a PP and RSP selection algorithm 602, according to an exemplary embodiment of the invention. As detailed herein, a PP and RSP selector obtains a list of cloud data centers that are in close proximity to the sender or receiver. The PP and RSP selector uses the client Internet protocol (IP) addresses to query a local instance of a given database to obtain the client's location, and subsequently queries CSTREAM metadata to determine the Q nearest cloud data centers. As used herein, Q is a configuration parameter, and can, for example, be set to less than 10 (5 being an example default value). To determine the most effective PP and RSP, the nearest geo-locations (in terms of network latency) may not suffice. In cases wherein two geo-locations are approximately equidistant (in terms of network latency), a data center that is less loaded (both from a compute and network perspective) can be given preference. Load considerations (both of the sender/receiver cache nodes, and the network between them) may lead to selection of a different set.

Further, cloud providers can have some data centers with larger compute and network infrastructure, and some points of presence with limited compute and network infrastructure, and in such instances, the bandwidth to/from the data centers may be higher than points of presence. Cloud-specific considerations such as, for example, the connectivity of each of cloud data center with different Internet service providers (ISPs), autonomous systems (AS), and/or carriers can lead to further searching of both network capacity (number of 10G connections to that ISP, for instance) and the nature of connectivity (peering versus transit, for instance). Such considerations can be reflected in the cost of a node in a data center (and can vary from one data center to another data center).

As described herein, a PP is the source node in an application level multicast tree. Also, as noted, the steps for selecting the most effective PP are illustrated in FIG. 6. The first step includes determining the geo-location of the sender (based on IP) using a given database, followed by determining the nodes in the Q nearest cloud geo-locations approximate to the sender (via physical distance). In accordance with one or more embodiments of the invention, it can be important to converge quickly so that streaming can start. Step 2 in the algorithm depicted in FIG. 6 includes calculating available bandwidth from the sender to each of the Q cloud data center locations using a variant of packet pair algorithms. Step 3 includes selecting a node as a PP based on the scores computed by InfraMonitor's score manager service. The score manager service can select a node based on available bandwidth, network jitter, connectivity type (transit or peering or direct link with sender/receiver ISP), node cost (different cloud data centers from the same provider have different node costs), node CPU and/or node memory.

At least one embodiment can include ranking each node based on available bandwidth (b/w), network jitter, connectivity type (transit or peering or direct link with sender/receiver ISP), node cost (different cloud data centers from the same provider have different node costs), node CPU and node memory. Such a rank can be based, for example, on computations made via Cumulative Rank $(Node_j) = \Sigma Rank_i \times Weight_i$ wherein $i \in \{av\_b/w \text{ to } Node_j, \text{network\_jitter to } Node_j, \text{connectivity type of } Node_j \text{ with sender}, Node_j \text{ cost}, Node_j \text{ CPU}, Node_j \text{ memory}\}$, and wherein $Weight_i$ is a user-specified weight for each resource. In such an embodiment, the node with the highest cumulative rank is selected as the PP for that stream.

Additionally, in one or more embodiments of the invention, the PP selector can select the server that has the lowest score (and hence the server with the most available resources) and that has been assigned to clients the least number of times since the last update of scores. Because score updates depend on the period of statistics collection (which can be on the order of seconds, for example), this can ensure that requests are distributed fairly amongst the servers between subsequent updates, and servers are not overwhelmed during demand spikes. Such action can be carried out by maintaining a map of the number of video processing nodes (VPNs) assigned per server between score updates, and clearing this map when a score update notification is received. Once a PP has been assigned to a specific stream, such metadata are stored, for example, as a JavaScript™ object notation (JSON) document in a given database.

For every new receiver that joins a live feed, at least one embodiment of the invention includes assigning the new receiver to an existing RSP on the application level multicast tree, if the available bandwidth of that RSP to the receiver is within a certain bound of the closest potential RSP, and if the resource utilization of the existing RSP is below a critical threshold value. This assists in reducing the startup time and cloud backbone network bandwidth. If this scenario is not possible, a new RSP is created on the application level multicast tree.

Selection of a new RSP for a new receiver is similar to the PP selection algorithm depicted in FIG. 6. However, at least one embodiment of the invention includes starting with one or more seed locations as RSPs based on user-specified popularity of a given live stream and/or predicted popularity of an event using social media analysis. For user-generated social streams, the location of potential consumers of that video stream can be determined via analysis of data associated with followers and/or friends of such users/consumers. For mainstream popular content (such as live sports broadcast, for example), the potential consumers of that video may be determined by predicting the popularity of a given event in different parts of a geographic distribution. The selected RSPs can also be added to a JSON document for the given live video feed in a database.

As detailed herein, at least one embodiment of the invention includes optimizing a cloud backbone network transfer in terms of end-to-end latency and jitter perceived by the users, as well as the total cost incurred by the cloud provider in terms of network bandwidth and compute resources. Such an embodiment includes using an application level multicast overlay scheme to send the feed from a PP to multiple RSPs for optimal usage of the cloud backbone network as well as low startup times, low end-to-end latency and throughput (for example, average bit rate).

Additionally, an overlay multicast or application level multicast can build a multicast tree at the application level. Links between nodes in the overlay can utilize one or more unicast protocols. Every new receiver can be connected to a RSP which, in turn, is connected to an existing nearby proxy. The addition of new receivers to an existing multicast tree can be achieved using one or more multicast tree building algorithms. For example, one or more embodiments of the invention can include adding a new RSP to an existing multicast tree via a technique similar to the selection of an RSP node for a new receiver using the PP and RSP selection algorithm depicted in FIG. 6.

For building the tree, at least one embodiment of the invention includes considering the PP node and Q closest data center locations that host an existing RSP for the given feed, and executing the algorithm given in FIG. 6 with a lower weight (that is, a higher importance) on the PP node. This allows multicast tree building/creation as receivers join, and new RSPs will not download the content from the PPs but from the closest RSPs. In one or more embodiments of the invention, the length of peer chains can be limited and/or capped to a constant based on empirical data.

On the arrival of a new live video feed or a new receiver, at least one embodiment of the invention can include additionally determining, in parallel, whether or not the system needs to be scaled (up or down) with the assistance of a capacity planner component.

FIG. 7 is a diagram illustrating capacity planning 702 for scaling up, according to an example embodiment of the invention. The service takes as input the score $\Sigma v$ of the server selected for hosting a PP or RSP (thus, the server having the lowest overall resource utilization). In one or more embodiments of the invention, if $\Sigma v$ is greater than a threshold value $\tau_{UP}$, then the system is scaled up (that is, another server from the list of provisioned servers is started), provided that no other provisioned server is pending activation. Note that $\Sigma v > \tau_{UP}$ would imply that the scores of all other servers are also higher than $\tau_{UP}$. Accordingly, a new server in the same data center (as the already selected server) is selected for activation and added to the list of pending servers until the new server is completely launched (after which it is removed from the list of pending servers).

FIG. 8 is a diagram illustrating capacity planning 802 for scaling down, according to an exemplary embodiment of the invention. The service determines whether or not the system needs to be scaled down based on the resource utilization levels across all of the active servers. Further, in one or more embodiments of the invention, only the last hop bandwidth utilization is considered for every member while computing its score, such that traffic generated due to other entities in the network is not falsely ascribed thereto. If a majority of the active members have scores higher than a threshold value $\tau_{DOWN}$, then the system is scaled down. The server with the longest "up time" is selected for deactivation to provide for maintenance (such as patch upgrades). As used herein, "up time" refers to the amount of time for which a server has been up (for example, the time difference between the current time and the time when the server was started). Note that while the selection of a member for deactivation removes the member from the tenant's list of active pool members, it does not imply the member's immediate shutdown. All active live video feeds to the server must expire before the member can be terminated.

Note that in one or more embodiments of the invention, the algorithms described in FIG. 3 through FIG. 8 need not perform all computations in the critical path of execution. The collection of different statistics can be offloaded to multiple threads executing in parallel, while scores can be simultaneously computed and cached. The design and architecture of one or more embodiments of the invention helps overcome multiple pain points commonly encountered during streaming of live video feeds. For example, for a low average bit rate, at least one embodiment of the invention includes allocating nodes such that there is high available bandwidth from a sender to PPs, from PPs to RSPs, between different RSPs, and from RSPs to receivers. Also, for a high buffering ratio, at least one embodiment of the invention includes allocating nodes such that there is low network jitter from a sender to PPs, from PPs to RSPs, between different RSPs, and from RSPs to receivers.

Additionally, for high join time, at least one embodiment of the invention includes implementing RSPs such that the RSPs can obtain content from a node which is closer in proximity to them as compared to a given PP, ensuring that the receivers can join a session quickly. Further, for high join failures, at least one embodiment of the invention includes selecting nodes based on available node CPU and memory, as well as augmenting capacity on demand. Also, in connection with the total cost of ownership (TCO) for cloud providers, at least one embodiment of the invention includes using an application level multicast overlay to optimize cloud backbone network bandwidth usage, and considering node cost while selecting PPs and RSPs to ensure that compute resources are optimized.

Figure 9:
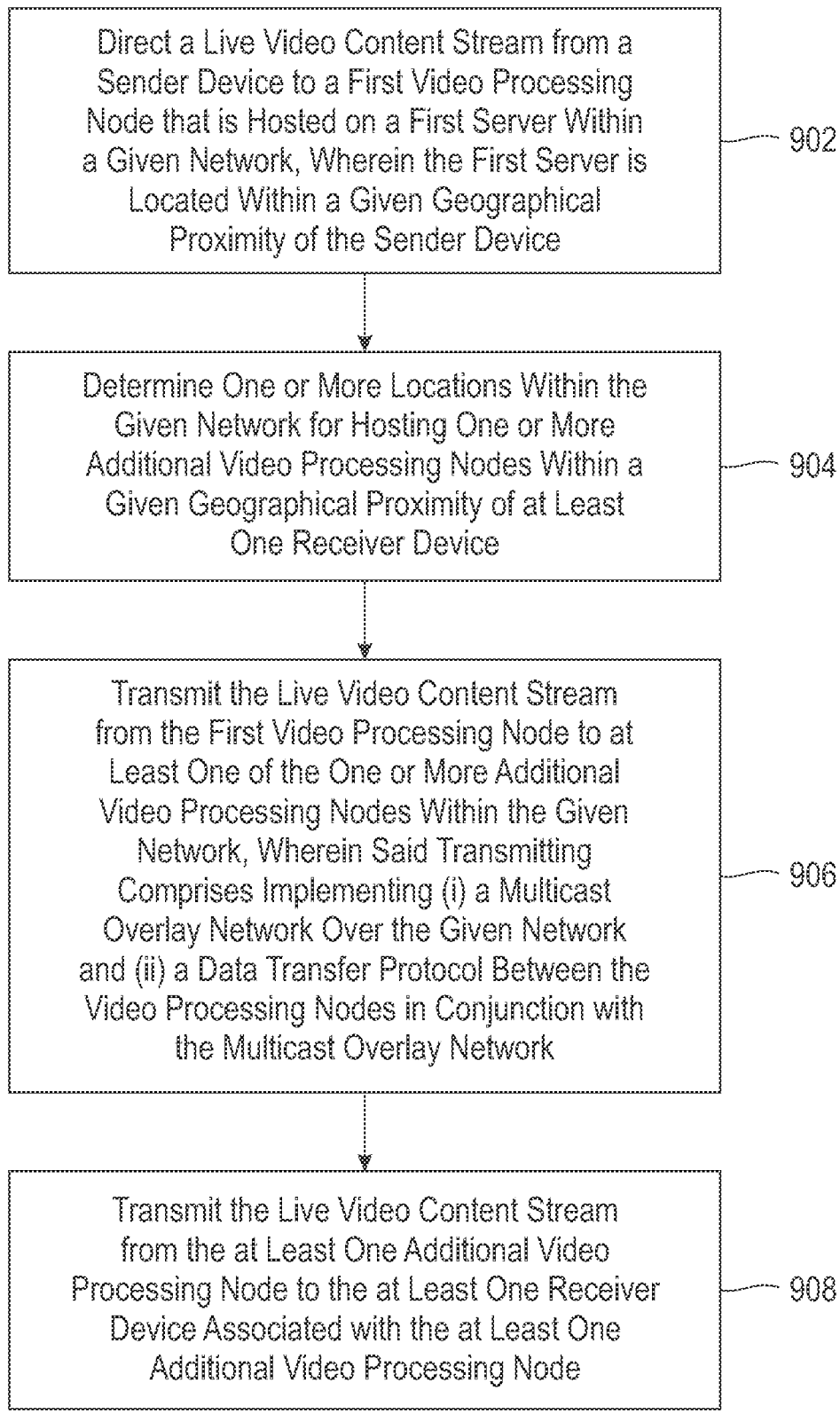
FIG. 9 is a flow diagram illustrating techniques according to an embodiment of the invention.

FIG. 9 is a flow diagram illustrating techniques according to an embodiment of the present invention. Step 902 includes directing a live video content stream from a sender device to a first video processing node that is hosted on a first server within a given network (for example, a cloud network), wherein the first server is located within a given geographical proximity of the sender device. The first video processing node can include a publishing point node that caches the live video content stream. Also, the first video processing node can be determined based on multiple parameters including at least (i) physical location, (ii) resource utilization, and (iii) cost. Additionally, at least one embodiment of the invention can include attributing a distinct weight to each of the multiple parameters.

Step 904 includes determining one or more locations within the given network for hosting one or more additional video processing nodes within a given geographical proximity of at least one receiver device. Each of the one or more additional video processing nodes can include a receiver side proxy node (located in close geographical proximity to the receiver devices) that caches the live video content stream. Determining the one or more locations can include using user-specified information pertaining to one or more popular locations, predicting one or more popular locations based on analysis of social media data, and/or using information pertaining to multiple parameters comprising at least (i) physical location, (ii) resource utilization, and (iii) cost, wherein each parameter has a distinct weight attributed thereto.

Step 906 includes transmitting the live video content stream from the first video processing node to at least one of the one or more additional video processing nodes within the given network, wherein said transmitting comprises implementing (i) a multicast overlay network over the given network and (ii) a data transfer protocol between the video processing nodes in conjunction with the multicast overlay network. Transmitting the live video content stream from the first video processing node to the at least one additional video processing node can include creating an application level multicast overlay between the first video processing node and the one or more additional video processing nodes, wherein the application level multicast overlay leverages the network between multiple cloud data centers and a lossless fast transport protocol between point to point links in a multicast tree.

Step 908 includes transmitting the live video content stream from the at least one additional video processing node to the at least one receiver device associated with the at least one additional video processing node. Transmitting the live video content stream from the at least one additional video processing node can include pulling one or more resolutions and/or one or more encodings from the at least one additional video processing node. Additionally, transmitting the live video content stream from the at least one additional video processing node can include transmitting via a push from the at least one additional video processing node.

Also, an additional embodiment of the invention includes directing a live video content stream from a sender device to a first video processing node that is hosted on a first server (located in close geographical proximity to the sender device) within a network, determining one or more locations within the network for hosting one or more additional video processing nodes, and associating a receiver device with a second video processing node (located in close geographical proximity of the receiver device) at one of the one or more determined locations within the network. Such an embodiment can also include transmitting the live video content stream from the first video processing node to at least the second video processing node, and transmitting the live video content stream from the second video processing node to the receiver device.

Associating a receiver device with a second video processing node can include assigning the receiver device to the second video processing node based on one or more parameters comprising at least network latency, wherein the second video processing node is pre-existing (pre-provisioned) within the network. Alternatively, associating a receiver device with a second video processing node can include provisioning a new node in the network as the second video processing node and assigning the receiver device to the second video processing node.

The techniques depicted in FIG. 9 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 9 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 10:
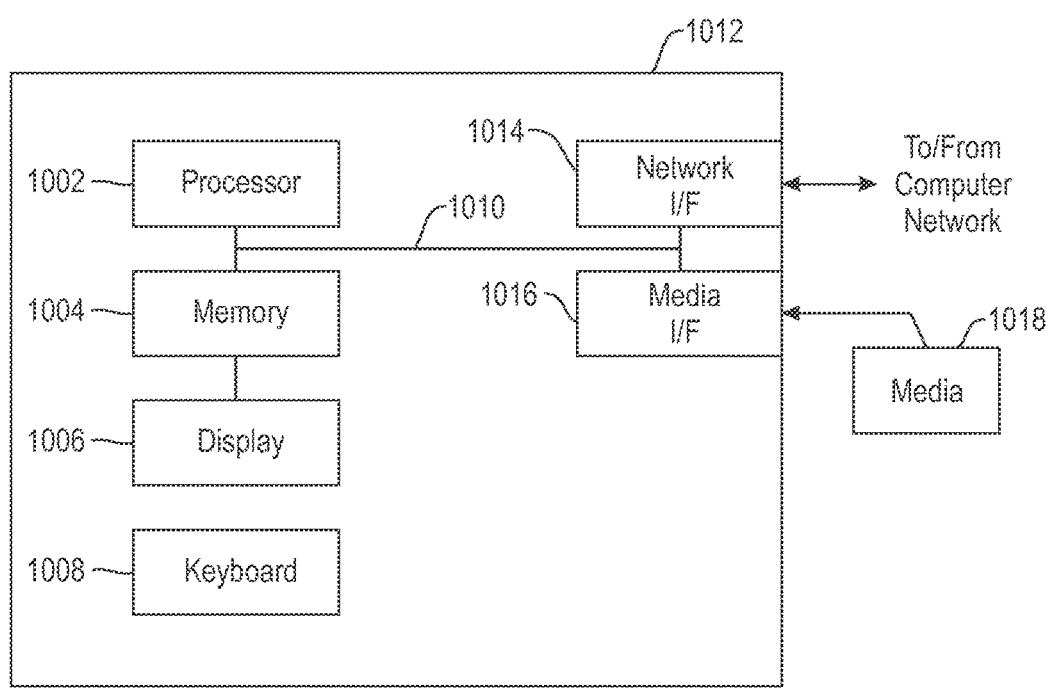
FIG. 10 is a system diagram of an exemplary computer system on which at least one embodiment of the invention can be implemented.

Additionally, an embodiment of the present invention can make use of software running on a computer or workstation. With reference to FIG. 10, such an implementation might employ, for example, a processor 1002, a memory 1004, and an input/output interface formed, for example, by a display 1006 and a keyboard 1008. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 1002, memory 1004, and input/output interface such as display 1006 and keyboard 1008 can be interconnected, for example, via bus 1010 as part of a data processing unit 1012. Suitable interconnections, for example via bus 1010, can also be provided to a network interface 1014, such as a network card, which can be provided to interface with a computer network, and to a media interface 1016, such as a diskette or CD-ROM drive, which can be provided to interface with media 1018.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1002 coupled directly or indirectly to memory elements 1004 through a system bus 1010. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 1008, displays 1006, pointing devices, and the like) can be coupled to the system either directly (such as via bus 1010) or through intervening I/O controllers (omitted for clarity).

Network adapters such as network interface 1014 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 1012 as shown in FIG. 10) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 1002. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, implementing (i) publishing point (PP) nodes on the cloud that are close to senders and (ii) receiver side proxy (RSP) nodes that are close to their respective receivers to stream live video to one or more geographically distributed receivers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    directing a live video content stream from a sender device to a first video processing node that is hosted on a first server within a given network, wherein the first server is located within a given geographical proximity of the sender device;
    determining one or more locations within the given network for hosting one or more additional video processing nodes within a given geographical proximity of at least one receiver device, wherein said determining the one or more locations comprises predicting one or more popular locations based on analysis of social media data, and wherein said predicting comprises:
        registering the live video content stream with (i) location information pertaining to the sender device and (ii) a description of the live video content stream using one or more tags; and
        searching the social media data to identify one or more locations associated with use of the one or more tags;
    transmitting the live video content stream from the first video processing node to at least one of the one or more additional video processing nodes within the given network, wherein said transmitting comprises implementing (i) a multicast overlay network over the given network and (ii) a data transfer protocol between the video processing nodes in conjunction with the multicast overlay network; and
    transmitting the live video content stream from the at least one additional video processing node to the at least one receiver device associated with the at least one additional video processing node;
    wherein the steps are carried out by at least one computing device.

2. The computer-implemented method of claim 1, wherein the first video processing node is determined based on multiple parameters comprising at least (i) physical location, (ii) resource utilization, and (iii) cost.

3. The computer-implemented method of claim 2, comprising:
    attributing a distinct weight to each of the multiple parameters.

4. The computer-implemented method of claim 1, wherein the first video processing node comprises a publishing point node.

5. The computer-implemented method of claim 1, wherein the given network comprises a cloud network.

6. The computer-implemented method of claim 1, wherein the first video processing node caches the live video content stream.

7. The computer-implemented method of claim 1, wherein each of the one or more additional video processing nodes comprises a receiver side proxy node.

8. The computer-implemented method of claim 1, wherein said determining the one or more locations comprises using user-specified information pertaining to one or more popular locations.

9. The computer-implemented method of claim 1, wherein said determining the one or more locations comprises using information pertaining to multiple parameters comprising at least (i) physical location, (ii) resource utilization, and (iii) cost.

10. The computer-implemented method of claim 9, comprising:
    attributing a distinct weight to each of the multiple parameters.

11. The computer-implemented method of claim 1, wherein the multicast overlay network leverages the given network between multiple cloud data centers and a lossless fast transport protocol between point to point links in a multicast tree.

12. The computer-implemented method of claim 1, wherein the at least one additional video processing node caches the live video content stream.

13. The computer-implemented method of claim 1, wherein said transmitting the live video content stream from the at least one additional video processing node comprises pulling one or more resolutions and/or one or more encodings from the at least one additional video processing node.

14. The computer-implemented method of claim 1, wherein said transmitting the live video content stream from the at least one additional video processing node comprises transmitting via a push from the at least one additional video processing node.

15. A computer program product, the computer program product comprising a non-transitory computer readable storage medium having program instructions embodied therewith, the program instructions executable by a device to cause the device to:
    direct a live video content stream from a sender device to a first video processing node that is hosted on a first server within a given network, wherein the first server is located within a given geographical proximity of the sender device;
    determine one or more locations within the given network for hosting one or more additional video processing nodes within a given geographical proximity of at least one receiver device, wherein said determining the one or more locations comprises predicting one or more popular locations based on analysis of social media data, and wherein said predicting comprises:
        registering the live video content stream with (i) location information pertaining to the sender device and (ii) a description of the live video content stream using one or more tags; and
        searching the social media data to identify one or more locations associated with use of the one or more tags;
    transmit the live video content stream from the first video processing node to at least one of the one or more additional video processing nodes within the given network, wherein said transmitting comprises implementing (i) a multicast overlay network over the given network and (ii) a data transfer protocol between the video processing nodes in conjunction with the multicast overlay network; and transmit the live video content stream from the at least one additional video processing node to the at least one receiver device associated with the at least one additional video processing node.

16. A system comprising:

a memory; and at least one processor coupled to the memory and configured for:
- directing a live video content stream from a sender device to a first video processing node that is hosted on a first server within a given network, wherein the first server is located within a given geographical proximity of the sender device;
- determining one or more locations within the given network for hosting one or more additional video processing nodes within a given geographical proximity of at least one receiver device, wherein said determining the one or more locations comprises predicting one or more popular locations based on analysis of social media data, and wherein said predicting comprises:
  - registering the live video content stream with (i) location information pertaining to the sender device and (ii) a description of the live video content stream using one or more tags; and
  - searching the social media data to identify one or more locations associated with use of the one or more tags;
- transmitting the live video content stream from the first video processing node to at least one of the one or more additional video processing nodes within the given network, wherein said transmitting comprises implementing (i) a multicast overlay network over the given network and (ii) a data transfer protocol between the video processing nodes in conjunction with the multicast overlay network; and
- transmitting the live video content stream from the at least one additional video processing node to the at least one receiver device associated with the at least one additional video processing node.

17. A computer-implemented method, comprising:

directing a live video content stream from a sender device to a first video processing node that is hosted on a first server within a network;

determining one or more locations within the network for hosting one or more additional video processing nodes, wherein said determining the one or more locations comprises predicting one or more popular locations based on analysis of social media data, and wherein said predicting comprises:
- registering the live video content stream with (i) location information pertaining to the sender device and (ii) a description of the live video content stream using one or more tags; and
- searching the social media data to identify one or more locations associated with use of the one or more tags;

associating a receiver device with a second video processing node at one of the one or more determined locations within the network;

transmitting the live video content stream from the first video processing node to at least the second video processing node; and transmitting the live video content stream from the second video processing node to the receiver device;

wherein the steps are carried out by at least one computing device.

18. The method of claim 17, wherein said associating comprises assigning the receiver device to the second video processing node based on one or more parameters comprising at least network latency, wherein the second video processing node is pre-existing within the network.

19. The method of claim 17, wherein said associating comprises:
- provisioning a new node in the network as the second video processing node; and
- assigning the receiver device to the second video processing node.

* * * * *